United States Patent
Petersen et al.

(10) Patent No.: US 7,537,198 B2
(45) Date of Patent: May 26, 2009

(54) DIRECT DOUBLE-ACTING IN-LINE SHUT-OFF GATE VALVE

(75) Inventors: Brian James Petersen, Ottawa, OH (US); David Richard Smith, Fort Jennings, OH (US)

(73) Assignee: Unverferth Manufacturing Company, Inc., Kalida, OH (US)

( * ) Notice: Subject to any disclaimer, the term of this patent is extended or adjusted under 35 U.S.C. 154(b) by 0 days.

(21) Appl. No.: 11/407,998

(22) Filed: Apr. 21, 2006

(65) Prior Publication Data

US 2006/0237681 A1 Oct. 26, 2006

Related U.S. Application Data

(60) Provisional application No. 60/673,381, filed on Apr. 21, 2005.

(51) Int. Cl.
*F16K 3/36* (2006.01)
(52) U.S. Cl. ............... 251/329; 251/355; 251/367
(58) Field of Classification Search ......... 251/326–329, 251/367, 355
See application file for complete search history.

(56) References Cited

U.S. PATENT DOCUMENTS

| | | | | |
|---|---|---|---|---|
| 966,150 A * | 8/1910 | Woodbridge | ............... | 251/328 |
| 1,206,469 A * | 11/1916 | Rockwell | ................ | 251/326 |
| 1,211,371 A * | 1/1917 | Rockwell | ................ | 251/326 |
| 3,069,132 A * | 12/1962 | Grove | ............ | 251/329 |
| 3,109,624 A * | 11/1963 | Edwarde | ............... | 251/329 |
| 3,158,352 A * | 11/1964 | Grove | ............ | 251/329 |
| 3,350,056 A * | 10/1967 | Blumenkranz | ............ | 251/328 |
| 3,353,784 A * | 11/1967 | Grove | ............ | 251/328 |
| 3,356,334 A * | 12/1967 | Scaramucci | ............ | 251/327 |
| 3,778,030 A * | 12/1973 | Carlin | ............ | 251/355 |
| 3,844,531 A * | 10/1974 | Grengs | ............ | 251/327 |
| 4,373,242 A * | 2/1983 | Goldman | ............ | 251/326 |
| 4,688,597 A * | 8/1987 | Clarkson et al. | ............ | 251/327 |
| 4,846,442 A * | 7/1989 | Clarkson et al. | ............ | 251/328 |
| 4,944,484 A * | 7/1990 | Hostetler | ............ | 251/327 |
| 5,085,403 A * | 2/1992 | Dierikx | ............ | 251/327 |
| 5,271,426 A * | 12/1993 | Clarkson et al. | ............ | 251/328 |
| 5,295,661 A * | 3/1994 | Roussel | ............ | 251/326 |
| 5,413,140 A * | 5/1995 | Kimpel et al. | ............ | 251/367 |
| 5,890,700 A * | 4/1999 | Clarkson et al. | ............ | 251/327 |
| 2005/0167630 A1* | 8/2005 | Kammerer et al. | ............ | 251/328 |

FOREIGN PATENT DOCUMENTS

EP 1376000 A1 * 1/2004

* cited by examiner

*Primary Examiner*—John Bastianelli
(74) *Attorney, Agent, or Firm*—Rothwell, Figg, Ernst & Manbeck, P.C.

(57) ABSTRACT

The present invention provides an actuated gate valve including a gate valve housing and an actuating device attached to one end of the gate valve housing. The gate valve housing includes a displaceable valve plate, and the actuating device includes an actuator rod connected to the valve plate so that a force applied to the valve plate by the actuator rod is coincident with a displacement of the valve plate.

11 Claims, 4 Drawing Sheets

DIRECT DOUBLE-ACTING IN-LINE SHUT-OFF GATE VALVE

CROSS-REFERENCE TO RELATED APPLICATIONS

This application claims the benefit of U.S. Provisional Application No. 60/673,381, filed Apr. 21, 2005, which is incorporated herein by reference in its entirety.

BACKGROUND OF THE INVENTION

1. Field of the Invention

The present invention relates to valves. More particularly, the present invention relates to actuated gate valves.

2. Description of Related Art

Gate valves are used to stop the flow of fluid in a tube or pipe. Typically, gate valves can handle material similar to the viscosity of water, or higher, as well as material that is in a vacuum or under small levels of pressure.

An exemplary prior art gate valve 100 is depicted in FIG. 1. An activation device 105, such as a pneumatic valve, is attached to the back side of a valve assembly frame 110 and transmits opening and closing forces to a valve plate 115, located on the front side of the valve assembly frame 110, using an actuator rod 125 coupled to a link 120 connected to an intermediate stem 155. A sealed housing 135 encloses the valve plate 115, and includes a coupling 130 through which the intermediate stem 155 passes. A piping interface plate 140, located on the front side of the housing 135, connects to a piping system (not shown), while another piping interface plate 142, located on the back side of the housing 135, attaches the housing 135 to the valve assembly frame 110. The piping interface plate 141 is coupled to the piping system (not shown) through an opening in the valve assembly frame 110. An additional piping interface plate (not shown) may also be attached to the back side of the valve assembly frame 110.

If the link 120 is connected directly to the intermediate stem 155 (not shown), an undesirable torque is applied to the intermediate stem 155 due to the misalignment of the line of action of the force applied by the activation device 105 and the centerline of the intermediate stem 155. This torque produces undesirable stresses in the intermediate stem 155 and the valve plate 115, as well as misalignments among the various components.

In order to reduce the effects of these undesirable stresses and misalignments, a spring assembly 150 can be incorporated into the gate valve 100 (shown), The spring assembly 150 includes upper and lower nuts 152, 154, attached to the intermediate stem 155, and upper and lower springs 156, 158, acting between the upper and lower surfaces of the link 120 and the upper and lower nuts 152, 154, respectively. Forces applied by the link 120 to the spring assembly 150 are transmitted to the intermediate stem 155 through the upper and lower nuts 152, 154, while misalignment of the Intermediate stem 155 is reduced due to the transverse flexibility of the spring assembly 150 and the freedom of movement afforded by the simple, contact interfaces between the upper and lower surfaces of the link 120 and the upper and lower springs 156, 158, respectively, as well as between the upper and lower springs 156, 158, the upper and lower nuts 152, 154, respectively.

However, the prior art gate valve 100 is mechanically complex, the undesirable stresses and misalignments have not been entirely eliminated and the upper and lower springs 156, 158 can limit the force that can be applied by the activation device 105 to the valve plate 115, resulting in unsatisfactory performance in many situations. Therefore, there is a need for an actuated gate valve that does not suffer from these infirmities.

BRIEF SUMMARY OF THE INVENTION

Embodiments of the present invention provide an actuated gate valve including a gate valve housing and an actuating device attached to one end of the gate valve housing, The gate valve housing includes a displaceable valve plate, and the actuating device includes an actuator rod connected to the valve plate so that a force applied to the valve plate by the actuator rod is coincident with a displacement of the valve plate.

BRIEF DESCRIPTION OF THE SEVERAL VIEWS OF THE DRAWING(S)

The above and other advantages of this invention will become more apparent by the following description of invention and the accompanying drawings.

DETAILED DESCRIPTION OF THE INVENTION

Figure 2:
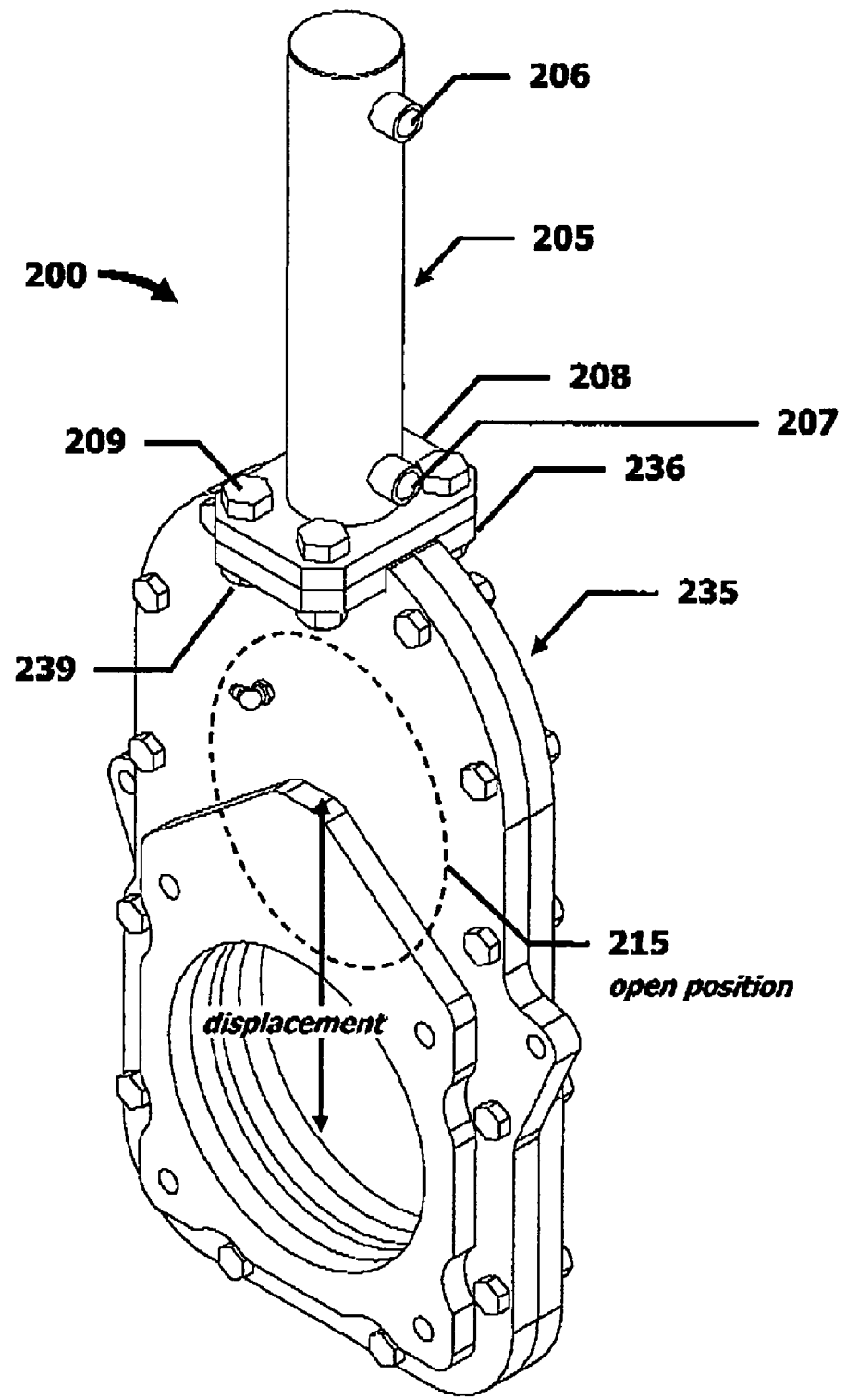
FIG. 2 depicts a gate valve in accordance with an embodiment of the present invention.
Figure 3:
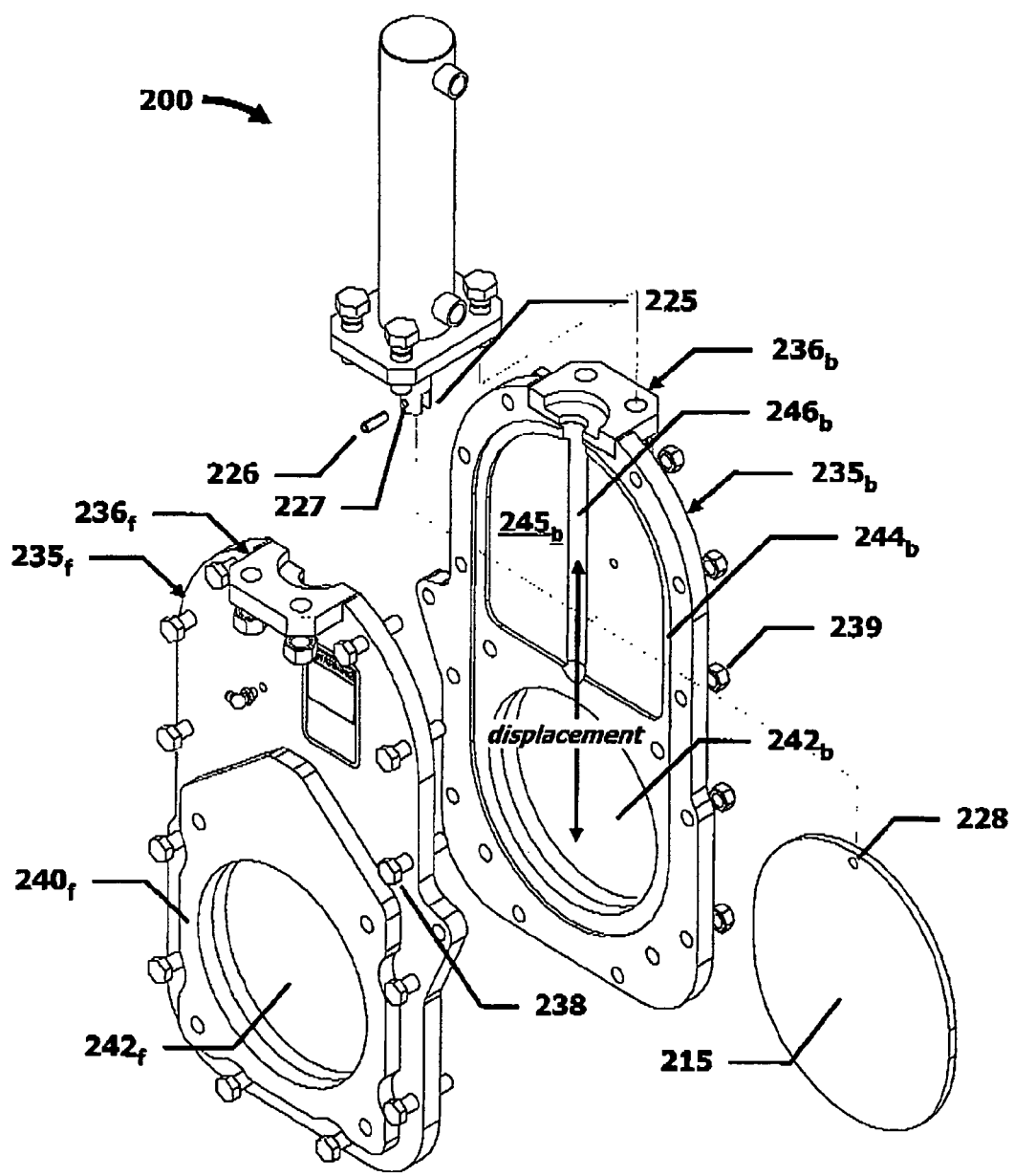
FIG. 3 is an exploded view of a gate valve in accordance with an embodiment of the present invention.

FIGS. 2 and 3 depict a gate valve 200 in accordance with an embodiment of the present invention.

The gate valve 200 includes an activation device 205 which is attached to one end of a sealed housing 235. In a preferred embodiment, the activation device 205 may be a double-acting hydraulic or pneumatic cylinder 205 that includes activation fluid couplings 206, 207, while in other embodiments, the activation device 205 may be an electric actuator, an electric motor, etc. The cylinder 205 includes an interface plate 208, which is attached to an actuator interface plate 236 of housing 235 using, for example, bolts 209 and nuts 239, welds or weldments, etc. A gasket may be interposed between interface plates 208 and 236, if necessary. The source of the activation fluid may be, for example, a hydraulic system on the vehicle on which the gate valve 200 is mounted, etc. In a preferred embodiment, cylinder 205 operates under a pressure range of about 1,500 to 3,000 psi.

In the preferred embodiment, the double-acting cylinder 205 advantageously provides a direct closing force of up to 4000 pounds in order to clear any small obstructions in the gate valve 200, such as, for example, sand, straw, sediment, etc. Furthermore, a closing force of this magnitude ensures complete closure of the valve plate 215, which is depicted in an open position in FIG. 2, and in a closed position in FIG. 3. The gate valve 200 may also regulate the fluid flow by positioning valve plate 215 in a partially open (or partially closed) position.

Figure 1:
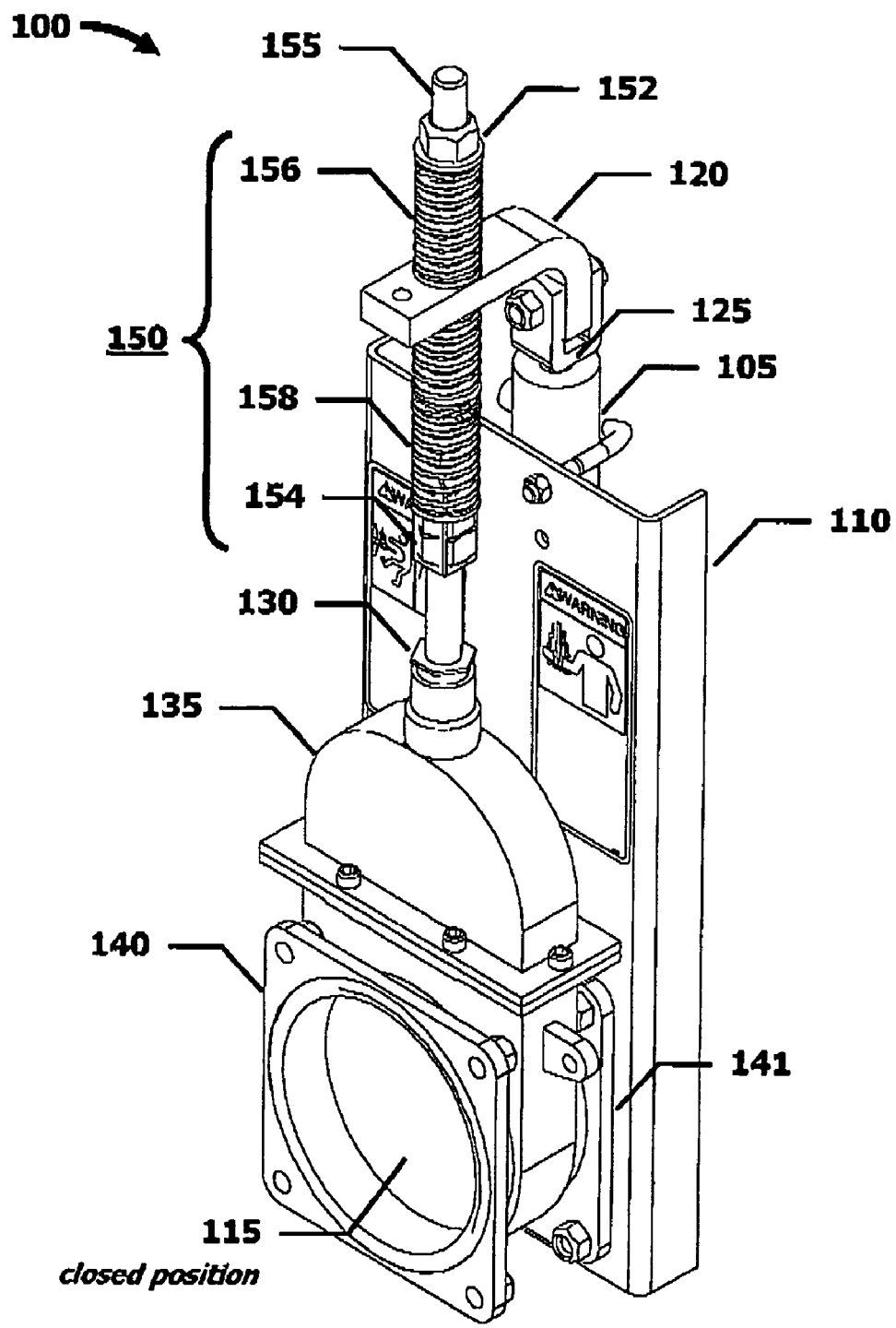
FIG. 1 shows a prior art gate valve design.

The cylinder 205 hosts an actuator rod 225 attached to the valve plate 215 using, for example, a pin 226 passing through holes 227, 228 in the actuator rod 225 and valve plate 215, respectively. The direct, in-line connection of the actuator rod 225 to the valve plate 215 provides several advantages over the prior art. For example, the link 120, the intermediate stem 155 and the spring assembly 150 (shown in FIG. 1) are not required, thereby completely eliminating the undesirable stresses and misalignments attendant to prior art devices. Commensurately, the coupling 130 is also eliminated, thereby eliminating the need for stem packing or some other form of seal at the top of the housing 135.

In one embodiment, the gate valve 200 is made of stainless steel, and housing 235 may be cast or machined as two identical parts, such as a front housing $235_f$ with a front actuator interface plate $236_F$, and a back housing $235_b$ with a back actuator interface plate $236_b$. Front and back housings $235_f$, $235_b$ may be attached together using, for example, bolts 238 and nuts 239, welds or weldments, etc. A gasket may be interposed between front and back housings $235_f$, $235_b$, if necessary. A cylindrical cavity $246_f$, $246_b$ is formed In each housing $235_f$, $235_b$ to permit the actuator rod 225 to move the valve plate 215 in a vertical direction (labeled "displacement") within the main cavity $244_f$, $244_b$. An additional cutout region, $245_f$, $245_b$ may also be formed within each housing $235_f$, $235_b$ to hold grease or other material to help seal and lubricate the valve, as well as to provide a cavity in which undesirable foreign material may be captured so as to prevent the valve plate 215 from pinching at the top of the main cavity $244_f$, $244_b$.

A front piping interface plate $240_f$ located on the front housing $235_f$ is connected to the piping system (not shown), while a back piping interface plate $240_b$ (not visible), located on the back housing $235_b$, is similarly connected. Piping interface plates $240_f$, $240_b$ include openings $242_f$, $242_b$ for fluid inlet and outlet.

Accordingly, the gate valve 200 presents several advantages over the prior art devices, such as eliminating the necessity of assembling two halves of the gate valve and then drilling and tapping the assembly to provide a cavity for the seal packing and nut. These advantages simplify the manufacturing processes, improve performance and promote better reliability in the field.

Figure 4:
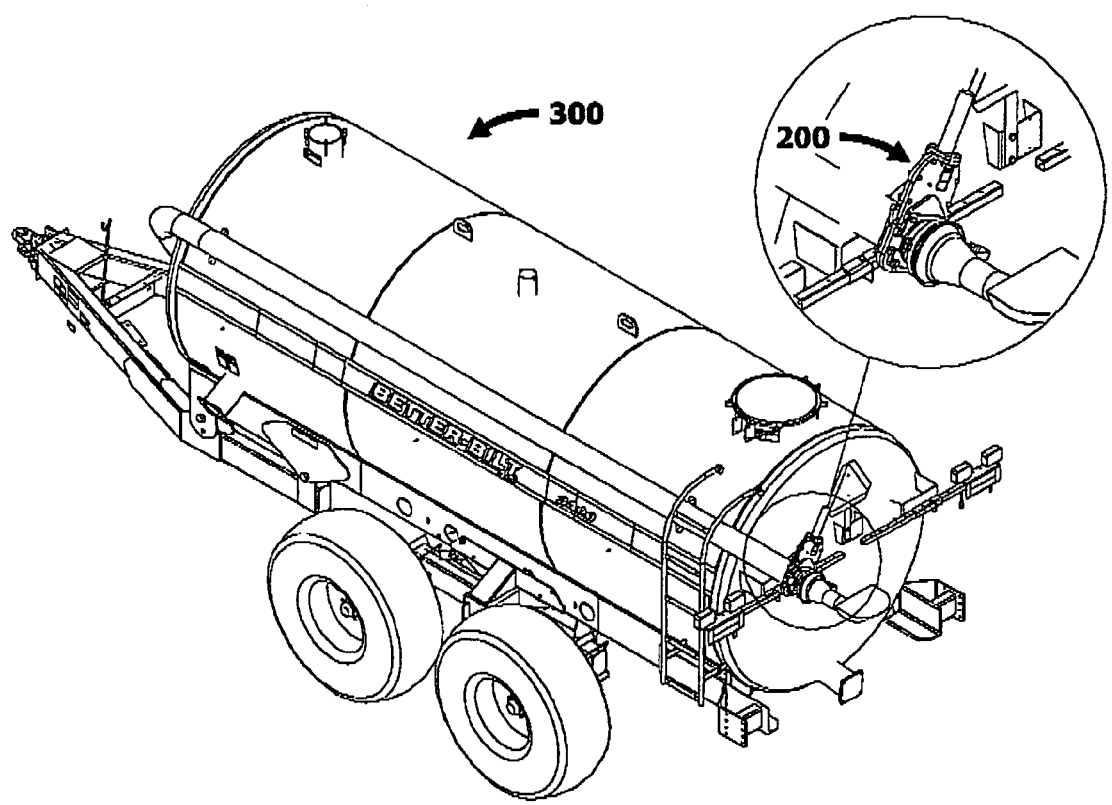
FIG. 4 illustrates an application of the present invention in accordance with an embodiment thereof.

FIG. 4 presents an application of the present invention in accordance with an embodiment thereof. For example, one application of the gate valve 200 would be on a liquid waste-handling tank 300 to stop the flow to a discharge pipe. Other applications may include liquid waste pumps, generally, as well as pumping systems in which an in-line, shut-off valve is needed but in which small debris pose a challenge for standard gate valves.

While this invention has been described in conjunction with specific embodiments thereof, many alternatives, modifications and variations will be apparent to those skilled in the art. Accordingly, the preferred embodiments of the invention as set forth herein, are intended to be illustrative, not limiting. Various changes may be made without departing from the true spirit and full scope of the invention as set forth herein.

What is claimed is:

1. An actuated gate valve, comprising:
   a gate valve housing comprising:
   two substantially identical housings, each identical housing having a recessed valve plate cavity portion, an additional cutout region positioned within the recessed valve plate cavity portion, said cutout region being a further recessed to capture debris and hold lubricant, and a semi-cylindrical actuator rod cavity portion, further recessed within the additional cutout region, the actuator rod cavity portion being disposed, at least in part, in the recessed valve plate cavity portion and in the additional cutout region,
   a fluid inlet,
   a fluid outlet, and
   a valve plate, slidingly disposed within the valve plate cavity, to regulate fluid flow through the gate valve housing; and
   an actuating device, attached to an end of the gate valve housing, having an actuator rod disposed within the actuator rod cavity portion and connected to the valve plate using a direct, in-line connection.

2. The actuated gate valve of claim 1, wherein the actuating device is a hydraulic actuator.

3. The actuated gate valve of claim 2, wherein the hydraulic actuator is removably attached to the end of the gate valve housing.

4. The actuated gate valve of claim 3, wherein the actuator rod is connected to the valve plate using a pin.

5. The actuated gate valve of claim 1, wherein the two identical housings are removably attached to one another.

6. The actuated gate valve of claim 1, wherein the fluid inlet and the fluid outlet are disposed on opposite sides of the gate valve housing and at an opposite end relative to the actuating device.

7. An actuated gate valve, comprising:
   a gate valve housing including a displaceable valve plate; and
   an actuating device, attached to one end of the gate valve housing, having an actuator rod connected to the valve plate to apply a force that is coincident with a displacement of the valve plate within the gate valve housing;
   wherein the gate valve housing is formed from two removably attached, substantially identical housings, each substantially identical housing having a recessed valve plate cavity portion, an additional cutout region disposed positioned within the recessed valve plate cavity portion, said cutout region being further recessed to capture debris and hold lubricant, a semi-cylindrical actuator rod further recessed within the additional cutout region and, cavity portion disposed at least in part in the recessed valve plate cavity portion, and a fluid opening disposed at an opposite end relative to the actuating device and wherein said actuator rod is disposed within the actuator rod cavity portion.

8. The actuated gate valve of claim 7, wherein the actuating device is a hydraulic actuator removably attached to the gate valve housing.

9. A method of assembling an actuated gate valve comprising:
   providing first and second substantially identical housing halves, each comprising a recessed valve plate cavity portion, an additional cutout region positioned within the recessed valve plate cavity portion, said cutout region being further recessed to capture debris and hold lubricant, a semi-cylindrical actuator rod cavity portion disposed at least in part in the recessed valve plate cavity portion and further recessed within the additional cutout region, and a fluid opening;
   placing an actuator rod in the semi-cylindrical actuator rod cavity portion of the first housing half connected to a valve plate positioned in the recessed valve plate cavity portion of the first housing half;
   securing the first and second housing halves together to form a gate valve housing assembly such that the recessed valve plate cavity portions form a recessed valve plate cavity and the semi-cylindrical actuator rod cavity portions form an actuator rod cavity; and
   attaching an actuating device to the actuator rod.

10. The method of claim 9 wherein the actuating device is a hydraulic actuator removably attached to the gate valve housing.

11. The method of claim 9, wherein said housing halves are cast.

* * * * *